(12) United States Patent
Spencer, III et al.

(10) Patent No.: US 10,503,888 B2
(45) Date of Patent: Dec. 10, 2019

(54) AUTHENTICATION SYSTEM

(71) Applicant: Traitware, Inc., Nevada City, CA (US)

(72) Inventors: Herbert W. Spencer, III, Santa Clarita, CA (US); Christopher M. Canfield, Santa Clarita, CA (US); Harlan Hutson, Santa Clarita, CA (US); Vince Conroy, Santa Clarita, CA (US); Steven A. Hickerson, Santa Clarita, CA (US)

(73) Assignee: Traitware, Inc., Nevada City, CA (US)

( * ) Notice: Subject to any disclaimer, the term of this patent is extended or adjusted under 35 U.S.C. 154(b) by 0 days.

(21) Appl. No.: 14/385,742

(22) PCT Filed: Mar. 15, 2013

(86) PCT No.: PCT/US2013/032040
§ 371 (c)(1),
(2) Date: Sep. 16, 2014

(87) PCT Pub. No.: WO2013/138714
PCT Pub. Date: Sep. 19, 2013

(65) Prior Publication Data
US 2015/0047000 A1 Feb. 12, 2015
US 2018/0012011 A9 Jan. 11, 2018

Related U.S. Application Data

(60) Provisional application No. 61/737,557, filed on Dec. 14, 2012, provisional application No. 61/708,607, (Continued)

(51) Int. Cl.
*G06F 17/30* (2006.01)
*G06F 7/04* (2006.01)
(Continued)

(52) U.S. Cl.
CPC .............. *G06F 21/35* (2013.01); *G06F 21/31* (2013.01); *G06F 21/316* (2013.01); *G06F 21/34* (2013.01);
(Continued)

(58) Field of Classification Search
CPC ...................................................... G06F 21/31
See application file for complete search history.

(56) References Cited

U.S. PATENT DOCUMENTS 4,264,782 A   4/1981   Konheim
5,708,422 A   1/1998   Blonder
(Continued)

FOREIGN PATENT DOCUMENTS

WO   WO2012069845   * 11/2010   ............. G06F 21/20
WO   WO2012069845   *  5/2012

OTHER PUBLICATIONS

Saxena, Ashutosh MMPS: A Versatile Mobile-to-Mobile Payment System 2005 p. 1-6 IEEE Computer Society.
(Continued)

*Primary Examiner* — Yin Chen Shaw
*Assistant Examiner* — Darshan I Dhruv
(74) *Attorney, Agent, or Firm* — Buchalter, a professional corp.; Kari Barnes

(57) ABSTRACT

A system for creating a combined electronic identification that obtains user information (202) about a user of a hardware device (100), authenticates the user from the user information (202), obtains a hardware profile (208) of the device (100), the hardware profile 208 comprising user generated data stored on the device (100) and links the user information (202) and the hardware profile (208) as a combined electronic identification. The hardware device (100) can be comprised of a main processor, memory, a touchscreen interface, and a wireless communication module, such as a mobile phone, computer, or tablet computer.

10 Claims, 10 Drawing Sheets

Related U.S. Application Data filed on Oct. 1, 2012, provisional application No. 61/612,023, filed on Mar. 16, 2012.

(51) Int. Cl.

| | |
|---|---|
| *G06F 15/16* | (2006.01) |
| *H04L 29/06* | (2006.01) |
| *G06F 21/35* | (2013.01) |
| *G06F 21/31* | (2013.01) |
| *H04W 12/06* | (2009.01) |
| *G06F 21/73* | (2013.01) |
| *G06F 21/34* | (2013.01) |
| *G06F 21/62* | (2013.01) |
| *H04W 12/00* | (2009.01) |

(52) U.S. Cl.
CPC ......... *G06F 21/6254* (2013.01); *G06F 21/73* (2013.01); *H04L 63/0876* (2013.01); *H04L 63/18* (2013.01); *H04W 12/06* (2013.01); *H04W 12/00522* (2019.01)

(56) References Cited

U.S. PATENT DOCUMENTS

| | | | |
|---|---|---|---|
| 5,903,830 A | 5/1999 | Joao | |
| 6,601,759 B2 | 8/2003 | Fife | |
| 6,986,039 B1 | 1/2006 | Leah | |
| 7,158,776 B1 | 1/2007 | Estes | |
| 7,197,541 B1 | 3/2007 | Skinner | |
| 7,331,518 B2 | 2/2008 | Rable | |
| 7,447,494 B2 | 11/2008 | Law | |
| 7,480,637 B2 | 1/2009 | Kolzay | |
| 7,493,497 B1 | 2/2009 | Tan, Jr. | |
| 7,496,765 B2 | 2/2009 | Sengoku | |
| 7,502,761 B2 | 3/2009 | Siegal | |
| 7,512,567 B2 | 3/2009 | Bemmel | |
| 7,566,002 B2 | 7/2009 | Love | |
| 7,673,149 B2 | 3/2010 | Ritter | |
| 7,685,629 B1 | 3/2010 | White | |
| 7,690,032 B1 | 3/2010 | Peirce | |
| 7,697,920 B1 | 4/2010 | McClain | |
| 7,793,109 B2 | 9/2010 | Ortiz | |
| 7,805,615 B2 | 9/2010 | Narendra | |
| 7,849,501 B2 | 12/2010 | Vishik | |
| 7,865,937 B1* | 1/2011 | White | G06Q 20/3674 705/67 |
| 7,877,611 B2 | 1/2011 | Camacho | |
| 7,904,360 B2 | 3/2011 | Evans | |
| 7,921,297 B2 | 4/2011 | Ortiz | |
| 7,953,976 B2 | 5/2011 | Giles | |
| 7,971,782 B1 | 7/2011 | Shams | |
| 7,975,150 B1 | 7/2011 | Lillibridge | |
| 7,979,054 B2 | 7/2011 | Baysinger | |
| 8,056,122 B2 | 11/2011 | Cho | |
| 8,078,885 B2 | 12/2011 | Jobmann | |
| 8,090,944 B2 | 1/2012 | Lee | |
| 8,116,731 B2 | 2/2012 | Buhrmann | |
| 8,122,004 B2 | 2/2012 | Hedge | |
| 8,150,108 B2 | 4/2012 | Miller | |
| 8,244,532 B1* | 8/2012 | Begeja | H04W 12/06 704/250 |
| 8,261,089 B2 | 9/2012 | Cobos | |
| 8,296,568 B2* | 10/2012 | Gupta | H04L 9/321 713/171 |
| 8,342,392 B2 | 1/2013 | Kiliccote | |
| 8,463,811 B2* | 6/2013 | Lakshmanan | G06F 17/30303 707/696 |
| 8,661,520 B2* | 2/2014 | Shakkarwar | G06F 21/34 705/75 |
| 9,112,842 B1* | 8/2015 | Gallagher, III | G06F 21/33 |
| 2001/0034717 A1 | 10/2001 | Whitworth | |
| 2001/0054148 A1* | 12/2001 | Hoornaert | E21B 41/0042 713/172 |
| 2002/0010857 A1 | 1/2002 | Karthik | |
| 2003/0130955 A1* | 7/2003 | Hawthorne | G06Q 20/04 705/65 |
| 2004/0010697 A1* | 1/2004 | White | G06F 21/31 713/186 |
| 2005/0165700 A1 | 7/2005 | Karthik | |
| 2006/0088186 A1* | 4/2006 | Era | G03B 35/18 382/100 |
| 2006/0112275 A1 | 5/2006 | Jeal | |
| 2006/0217113 A1* | 9/2006 | Rao | H04L 41/0233 455/422.1 |
| 2006/0292539 A1* | 12/2006 | Jung | G09B 7/06 434/322 |
| 2006/0294209 A1* | 12/2006 | Rosenbloom | H04N 1/0097 709/220 |
| 2007/0079137 A1 | 4/2007 | Tu | |
| 2008/0021834 A1* | 1/2008 | Holla | G06F 19/322 705/51 |
| 2008/0048021 A1* | 2/2008 | Shieh | G06Q 10/02 235/380 |
| 2008/0120698 A1 | 5/2008 | Ramia | |
| 2008/0235731 A1 | 5/2008 | Bryant | |
| 2009/0003663 A1* | 1/2009 | Webster | G06K 9/00154 382/119 |
| 2009/0076966 A1 | 3/2009 | Bishop | |
| 2009/0083117 A1* | 3/2009 | Svendsen | H04L 67/30 709/205 |
| 2009/0177587 A1 | 7/2009 | Siegal | |
| 2009/0204457 A1 | 8/2009 | Buhrmann | |
| 2009/0241175 A1 | 9/2009 | Trandal | |
| 2010/0011071 A1* | 1/2010 | Zheleva | G06F 21/55 709/206 |
| 2010/0070405 A1 | 3/2010 | Joa | |
| 2010/0088749 A1 | 4/2010 | Steeples | |
| 2010/0131414 A1 | 5/2010 | Tame | |
| 2010/0293601 A1 | 11/2010 | Schultz | |
| 2011/0035788 A1* | 2/2011 | White | G06F 21/32 726/4 |
| 2011/0067116 A1 | 3/2011 | Lu | |
| 2011/0138176 A1 | 6/2011 | Mansour | |
| 2011/0142234 A1 | 6/2011 | Rogers | |
| 2011/0143711 A1 | 6/2011 | Hirson | |
| 2011/0185181 A1 | 7/2011 | Lin | |
| 2011/0196932 A1* | 8/2011 | Jackson | G06Q 10/107 709/206 |
| 2011/0202453 A1 | 8/2011 | Issa | |
| 2011/0213969 A1 | 9/2011 | Nakhjiri | |
| 2011/0214158 A1 | 9/2011 | Pasquero | |
| 2011/0225417 A1 | 9/2011 | Maharajh | |
| 2011/0231911 A1* | 9/2011 | White | G06F 21/32 726/7 |
| 2011/0244919 A1 | 10/2011 | Aller | |
| 2011/0246369 A1* | 10/2011 | de Oliveira | G06Q 20/382 705/64 |
| 2012/0008769 A1 | 1/2012 | Collins | |
| 2012/0091202 A1* | 4/2012 | Cohen | G06F 21/33 235/382 |
| 2012/0144461 A1 | 6/2012 | Rathbun | |
| 2012/0160912 A1* | 6/2012 | Laracey | G06Q 20/1085 235/379 |
| 2012/0192258 A1* | 7/2012 | Spencer | H04W 12/06 726/7 |
| 2012/0201381 A1* | 8/2012 | Miller | H04L 9/16 380/255 |
| 2012/0203646 A1* | 8/2012 | Morgan | H04W 12/06 705/21 |
| 2012/0265679 A1 | 10/2012 | Calman | |
| 2013/0031623 A1 | 1/2013 | Sanders | |
| 2013/0068837 A1* | 3/2013 | Dollard | G06F 21/36 235/380 |
| 2013/0097701 A1* | 4/2013 | Moyle | G06F 21/552 726/22 |
| 2013/0159476 A1* | 6/2013 | Hilburn | H04L 67/303 709/220 |

(56) References Cited

U.S. PATENT DOCUMENTS

2013/0167196 A1* 6/2013 Spencer .............. H04W 8/22
726/3
2015/0089591 A1* 3/2015 Harris ................. G06F 21/34
726/4
2015/0278805 A1   10/2015 Spencer et al.

OTHER PUBLICATIONS

Gao, Jerry A Wireless Payment System 2005 p. 1-8 IEEE Computer Society.
Kanter, Theo An Open Service Architecture for Adaptive Personal Mobile Communication Dec. 2001 p. 8-17 IEEE Personal Communications.
Hasan, Jahnert Authentication, Authorization, Accounting, and Charging for the Mobile Internet 2001 p. 1-6 Web.
Peirce, Michael Flexible Real-Time Payment Methods for Mobile Communications Dec. 1999 p. 44-55 IEEE Personal Communications.
Herzberg, Amir Payments and Banking With Mobile Personal Devices May 2003 p. 53-58 Communications of the ACM.
Towhidi, Farnaz Knowledge Based Authentication Attacks 2010 p. 1-5 Web.
Tanaka, Michiru A Method and Its Usability for User Authentication by Utilizing a Matrix Code Reader on Mobile Phones 2007 p. 1-12 Springer-Verlag Berlin Heidelberg.
Montjoye, Yves-Alexandre Unique in the Crowd: The Privacy Bounds of Human Mobility Jul. 2005 p. 1-5 Scientific Reports.

* cited by examiner

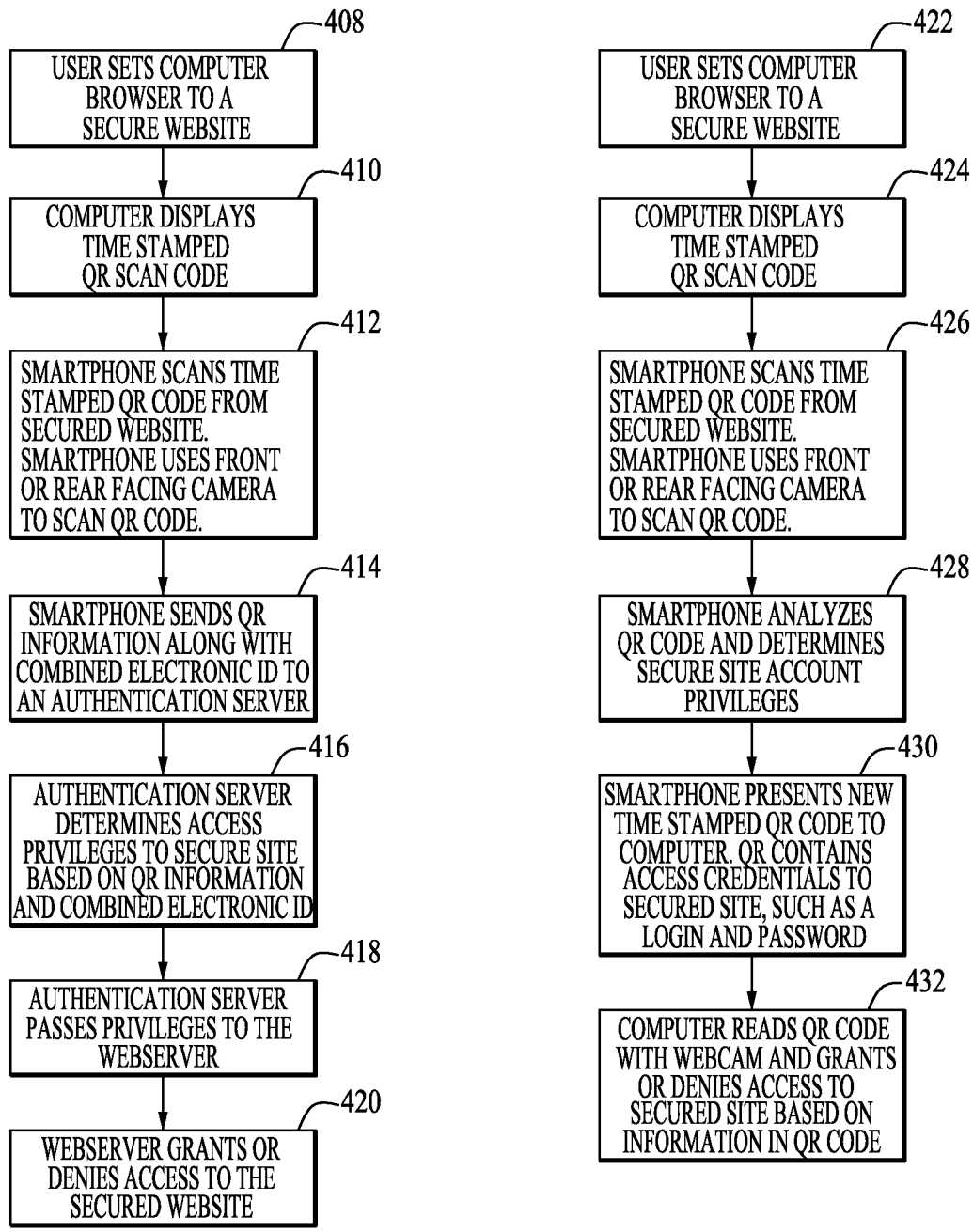

AUTHENTICATION SYSTEM

CROSS-REFERENCE TO RELATED APPLICATIONS

The present Application is a national stage of International Patent Application No. PCT/US2013/032040, titled "Authentication System," filed Mar. 15, 2013, which claims the benefit of U.S. Provisional Patent Application Nos. 61/612,023 filed Mar. 16, 2012, 61/708,607 filed Oct. 1, 2012, and 61/737,557 filed Dec. 14, 2012, the contents of which are incorporated herein by reference in their entirety.

BACKGROUND

Identity fraud is the leading type of credit card fraud in the US. Over 9 million adults are victims each year, which results in $100 million in merchant losses. Despite the increased digital power at our disposal, the state of the current security systems available for the prevention of identity fraud is still inadequate.

A problem associated with current security systems is that they lack the ability to truly discern an identity of an individual at the fundamental level.

Accordingly, there is a need for a better security system that is able to truly discern an identity of an individual in order to prevent identity fraud.

SUMMARY

The present invention is directed to methods and systems that satisfy this need. An exemplary method comprises obtaining user information about a user of a hardware device, authenticating the user from the user information, obtaining a hardware profile of the device, the hardware profile comprising user generated data stored on the device, and linking the user information and the hardware profile as a combined electronic identification. The hardware device can comprise a processor, memory, a touchscreen interface, and a wireless communication module, and can be a device such as a mobile phone, computer, or tablet computer.

Preferably, linking comprises concatenating the user information and the hardware profile.

The invention is also directed to a method for creating a combined electronic identification associated with a hardware device comprising the steps of inputting user information about a user on the device, sending the user information from the device to a server, receiving authentication from the server, and sending a hardware profile from the device to the server to create a combined electronic identification, the hardware profile comprising user generated data stored on the device.

In one version the hardware profile comprises information on the hardware device selected from the group consisting of (a) contact information, (b) mobile network code, (c) information about music, (d) pixel colors from a background screen, (e) installed applications, (f) arrangement of the applications, (g) frequency of use of applications, (h) location of the user, (i) Bluetooth device pairings, (j) carrier name, (k) mobile country code, (l) phone number, (m) photos, (n) device name, (o) MAC address, (p) device type, and combinations of one or more thereof.

In one version the user is authenticated from user information, the user information comprising information about the user selected from the group consisting of the user's (a) name, (b) social security number, (c) national identification number, (d) passport number, (e) IP address, (f) vehicle registration number, (g) vehicle license plate number, (h) driver's license number, (i) appearance, (j) fingerprint, (k) handwriting, (l) credit card information, (m) bank account information, (n) digital identity, (o) date of birth, (p) birthplace, (q) past and current residence, (r) age, (s) gender, (t) marital status, (u) race, (v) names of schools attended, (w) workplace, (x) salary, (y) job position, (z) biometric data, and combinations of one or more thereof.

In another version, the user provides answers to knowledge based questions that only the user would know all the answers to. The probability to which the user is identified can also be determined.

In one version the user information comprises biometric data of the user, such as fingerprint, retina, and voice data.

In another version of the invention at least one of the user information and the hardware profile are salted and hashed prior to linking to create a combined electronic identification. Alternatively, both the user information and the hardware profile are salted and hashed prior to linking. Preferably, salting is done by a three to seven digit random number generator, and hashing is done by SHA-2.

Preferably, the hardware profile and user information are salted and hashed before transfer to any external device. The salting and hashing can be by individual items or in groups of items.

A system for performing for creating a combined electronic identification associated with a hardware device comprising a processor, memory, an input interface, and a transmitter, the processor being programmed to process through the input interface the user information, transmit through the transmitter the user information to a first server, receive through the transmitter authentication from a second server, transmit through the transmitter the hardware profile to the first server to create a combined electronic identification.

In one embodiment, the first and second server are the same server.

In one version the hash information and hardware are truncated to reduce the amount of information transmitted to a server. The truncation can be performed in such a way that sufficient information is retained to differentiate one user from another user.

The present invention is also directed to a method of allowing a transaction by a user utilizing a stored electronic identification, the stored electronic identification comprising a first stored hardware profile and stored user information, the method comprising the steps of receiving user information and a hardware profile of hardware associated with the user, both hardware profiles comprising user generated data stored on the device, comparing the received user information and the received hardware profile against the stored electronic profile, wherein the received hardware profile and the stored hardware profile are different by at least 0.02%, and allowing the transaction to proceed only if the received hardware profile and the stored hardware profile match by at least 60% and the received user information and the stored user information match by at least 30%.

The present invention is also directed to a method for a user to perform a transaction with an electronic communication device comprising the steps of salting and hashing a hardware profile of the electronic communication device with user information stored on the device, the hardware profile comprising user generated data stored on the device, sending the salted and hashed hardware profile and the user information to a server, and receiving instructions from the server regarding whether or not to proceed with the transaction.

Alternatively, the method further comprises the step of entering a security pin to verify the user.

The present invention is also directed to a method for a user to perform a transaction utilizing a first electronic communication device comprising the steps of connecting with a transaction receiver, receiving from the transaction receiver electronic data for a second electronic communication device different from the first electronic communication device, the second electronic communication device having a user associated therewith and a hardware profile associated therewith, the hardware profile comprising user generated data stored on the device, sending with the second electronic communication device at least part of the received electronic data, user information of the user, and the hardware profile to an authentication server, and if the authentication server authenticates the sent user information, the hardware profile, and the sent electronic data, performing the transaction with the first electronic communication device. Preferably, the first electronic communication device is a desktop computer and the second electronic device is a smartphone.

Alternatively, the method can comprise the additional step of authenticating with the authentication server.

In one version the first electronic communication device comprises a visual display, wherein the visual display is read with the second electronic communication device.

In another version the second electronic communication device comprises a visual display, wherein the visual display is read with the first electronic communication device.

Preferably, the visual display is a Quick Response (QR) code.

The present invention is also directed to a system for creating a combined electronic identification associated with a hardware device comprising a processor, memory, and a connection for receiving information executable by the processor. The processor being programmed to receive through the connection the user information, authenticate the user from the user information, receive through the connection the hardware profile, store in memory the received user information and the received hardware profile, and link the user information and the hardware profile together as a combined electronic identification.

The present invention is also directed to a system for allowing a transaction by a user comprising a processor, memory, and a connection for receiving information for processing by the processor. The memory stores the stored user information and the stored hardware profile. The processor is programmed to receive through the connection the received user information and the received hardware profile, compare the received user information and the received hardware profile against the stored hardware profile wherein the received hardware profile and the stored hardware profile are different by at least 0.02%, and execute the transaction if the received hardware profile and the stored hardware profile match by at least 60% and the received user information and the stored user information match by at least 30%.

The present invention is also directed to a method of performing a transaction for a user using a first electronic communication device to perform the transaction comprising the steps of receiving information from the first electronic communication device, transmitting electronic data to the user, receiving from a second electronic communication device of the user at least part of the transmitted electronic data, user information associated with the second electronic communication device, and a hardware profile of the second communication device, the hardware profile comprising user generated data stored on the device, determining if the received electronic data, user information and hardware profile are authentic, and if authentic, permitting the user to perform the transaction with the first electronic communication device.

The present invention is also directed to a system for performing a transaction for a user using a first electronic communication device to perform the transaction comprising a processor, memory, and a connection for receiving information executable by the processor. The memory stores electronic data. The processor is programmed to receive through the connection information from the first electronic communication device, transmit through the connection the stored electronic data to the user, receive through the connection from the second electronic communication device at least part of the transmitted electronic data, user information associated with the second communication device, and hardware profile of the second communication device, and determine if the received electronic data, user information and hardware profile are authentic, and if authentic, permitting the user to perform the transaction with the first electronic communication device.

In one version of the invention, the received electronic data, user information and hardware profile are authentic, and the processor is programmed to send through the connection to the first electronic communication device a response regarding whether or not to perform the transaction.

DRAWINGS

These and other features, aspects and advantages of the present invention will become better understood with regard to the following description, appended claims, and accompanying figures where:

Figure 4A:
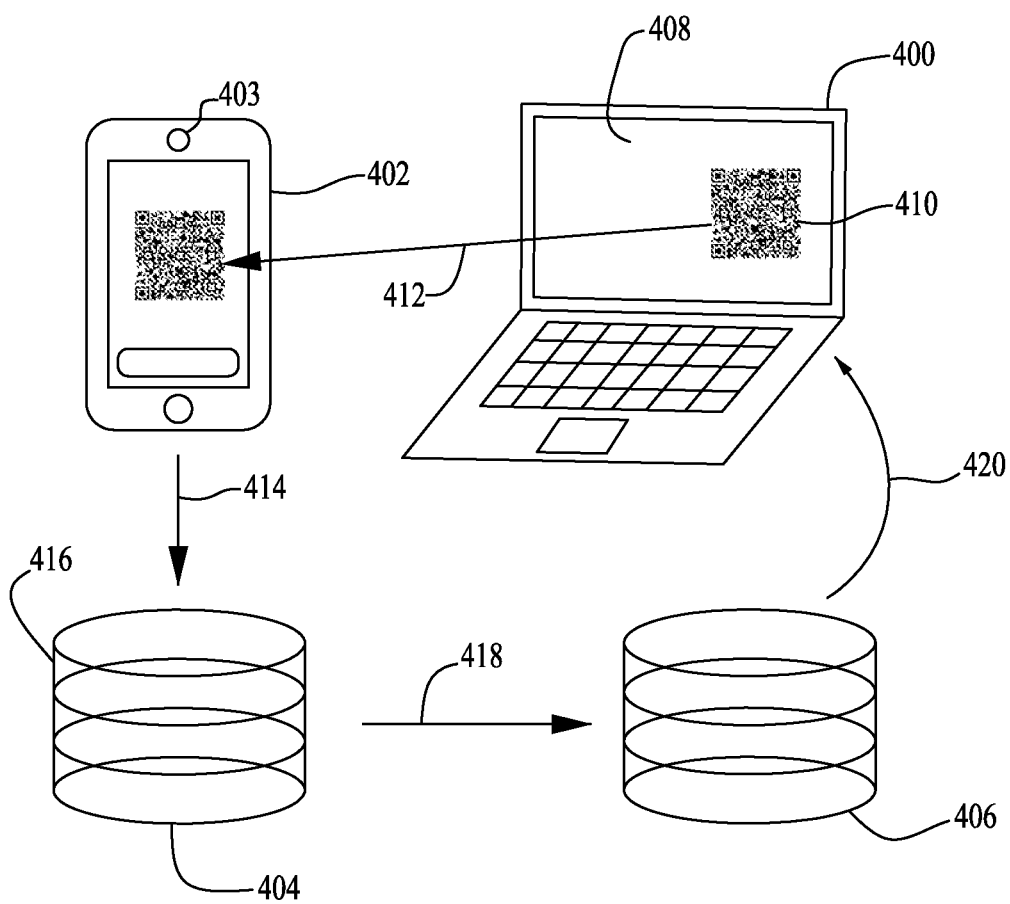
FIG. 4A shows a diagram of a system and method for performing a transaction with a computer and a smartphone from both the user side and the server side.
Figure 4B:
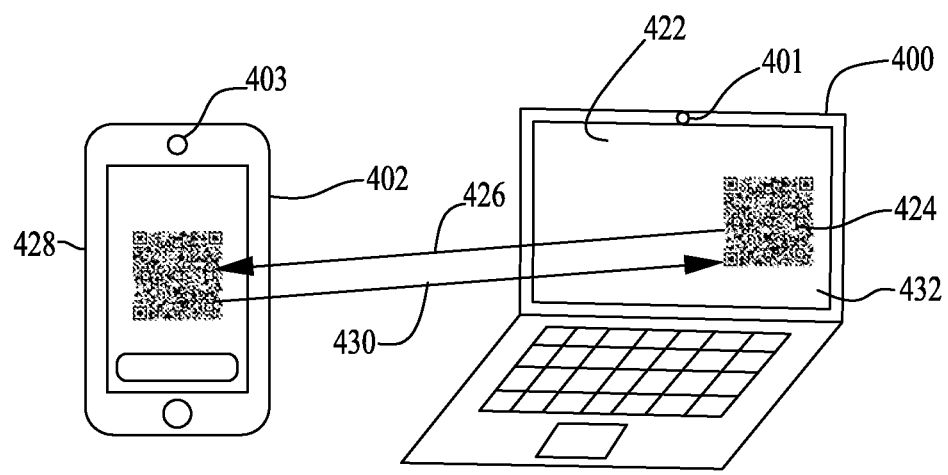
FIG. 4B shows a version of the invention for performing a transaction with a computer and a smartphone from both the user side and the server side.
Figure 4C:
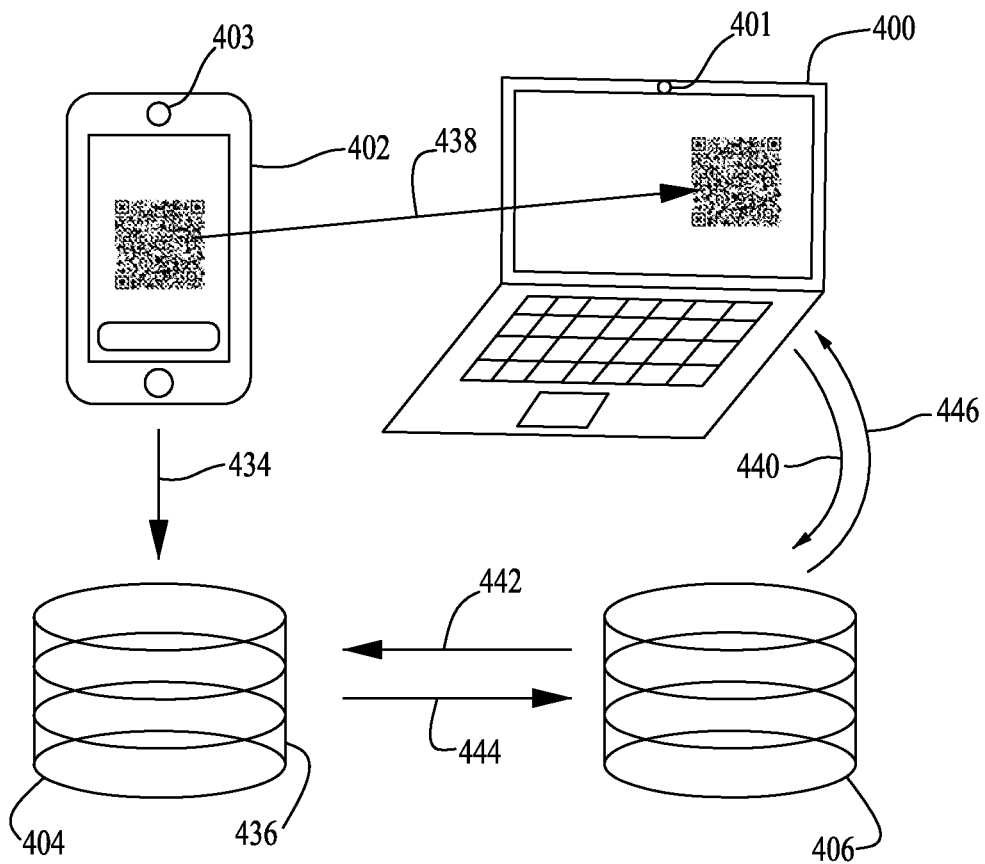
FIG. 4C shows a version of the invention for performing a transaction with a computer and a smartphone from both the user side and the server side.
Figure 4F:
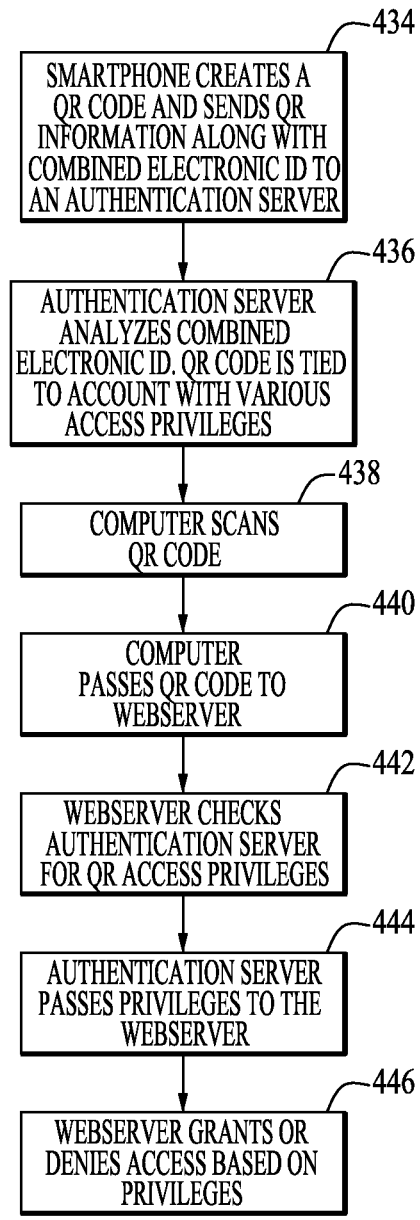

FIG. 4D describes a method of performing a transaction with a first electronic communication device and a second electronic communication device;

FIG. 4E shows a version of the invention where a user scans a visual display generated by a secure website on a first electronic communication device with a second electronic communication device, and the second electronic communication device determines if the second electronic communication device has the appropriate credentials to access the secured website;

FIG. 4F shows a version of the invention, where a user's smartphone, which has been previously authenticated, creates a QR code, or sends a wireless signal using NFC or Bluetooth, which contains encoded information about the user;

DESCRIPTION

Methods and systems that implement the embodiments of the various features of the invention will now be described with reference to the drawings. The drawings and the associated descriptions are provided to illustrate embodiments of the invention and not to limit the scope of the invention. Reference in the specification to "one embodiment", "an embodiment", or "one version" is intended to indicate that a particular feature, structure, or characteristic described in connection with the embodiment is included in at least an embodiment of the invention. The appearances of the phrase "in one embodiment", "an embodiment", or "one version" in various places in the specification are not necessarily all referring to the same embodiment.

Throughout the drawings, reference numbers are re-used to indicate correspondence between referenced elements. In addition, the first digit of each reference number indicates the figure where the element first appears.

As used in this disclosure, except where the context requires otherwise, the term "comprise" and variations of the term, such as "comprising", "comprises", and "comprised" are not intended to exclude other additives, components, integers or steps.

In the following description, specific details are given to provide a thorough understanding of the embodiments. However, it will be understood by one of ordinary skill in the art that the embodiments may be practiced without these specific details. Well-known circuits, structures and techniques may not be shown in detail in order not to obscure the embodiments. For example, circuits may be shown in block diagrams in order not to obscure the embodiments in unnecessary detail.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, storage may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, or a combination thereof. When implemented in software, firmware, middleware or microcode, the program code or code segments to perform the necessary tasks may be stored in a machine-readable medium such as a storage medium or other storage(s). One or more than one processor may perform the necessary tasks in series, concurrently or in parallel. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted through a suitable means including memory sharing, message passing, token passing, network transmission, etc.

In the following description, certain terminology is used to describe certain features of one or more embodiments of the invention.

"Transaction" means a communicative action or activity involving two parties or things that reciprocally affect or influence each other.

"Hardware profile" means data that is generated by a user with regard to a hardware device and at least some data specifically associated with and created by the user. As examples, it can be information relating to installed applications, portions of the user's contacts, applications added by the user, music added by the user, and the like.

Figure 1:
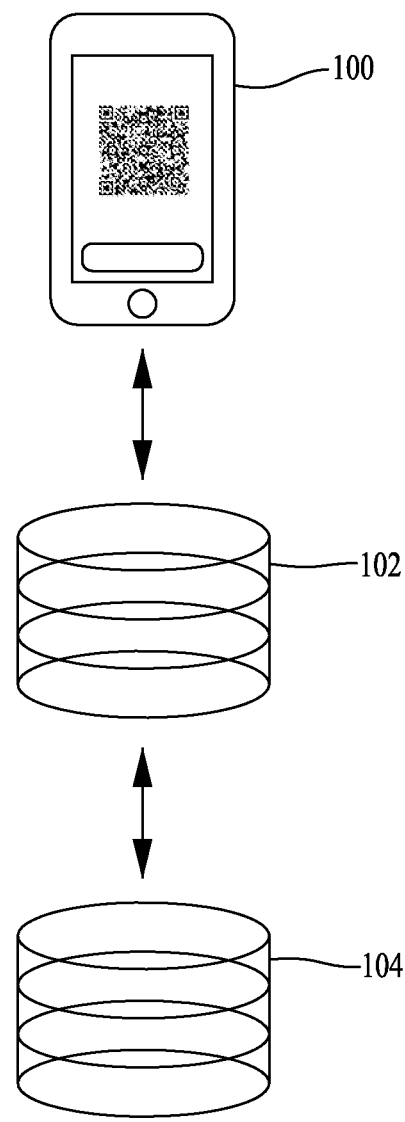
FIG. 1 shows a diagram of a system for creating a combined electronic identification and for allowing a transaction by a user to proceed.

FIG. 1 shows an embodiment of the present invention, depicting a system for creating a combined electronic identification and for allowing a transaction by a user to proceed, comprising a hardware device 100, an authentication server 102, and an evaluation server 104. The hardware device 100 is preferably any device configured with a touchscreen that has the ability to engage in secure wireless communications with various communication networks, such as cellular, satellite and the various forms of Internet connectivity. In one embodiment, the hardware device 100 is capable of capturing biometric input including, but not limited to, fingerprint, facial recognition, voice verification, and vein verification.

In another embodiment, the hardware device 100 comprises a processor, memory, an input interface, and a transmitter, the processor being programmed to process through the input interface the user information, transmit through the transmitter the user information to a first server, receive through the transmitter authentication from a second server, and transmit through the transmitter the hardware profile to the first server to create a combined electronic identification. In one version of the invention, the hardware device 100 is a mobile phone, computer, or tablet computer. The input interface is preferably a touchscreen interface, and the transmitter is preferably a wireless communication module. Alternatively, the first and second server are the same server.

In one embodiment, the authentication server 102 comprises a processor, memory, an input interface, and a connection for receiving information executable by the processor, the processor being programmed to receive through the connection user information, authenticate the user from the user information, receive through the connection a hardware profile, store in memory the received user information and the received hardware profile, and link the user information and the hardware profile together as a combined electronic identification.

Preferably the authentication server 102 is an infrastructure as a service (IaaS) provider that includes at least two 64-bit high-CPU medium Amazon Elastic Compute Cloud (EC2) server instances to be used for active Mongo database hosts, which are connected to a load balancer, which is in turn connected to the client. Preferably, the authentication server 102 also includes 16 Elastic Block Store (EBS) volumes to be used in two redundant array of independent disks (RAID) 10 arrays to support active Mongo database servers, and one 64-bit micro instance to be used for Mongo Arbiter role.

Preferably, the evaluation server 104 can be associated with any third party authentication authority such as a credit information agency, such as, but not limited to, Experian.

Figure 2A:
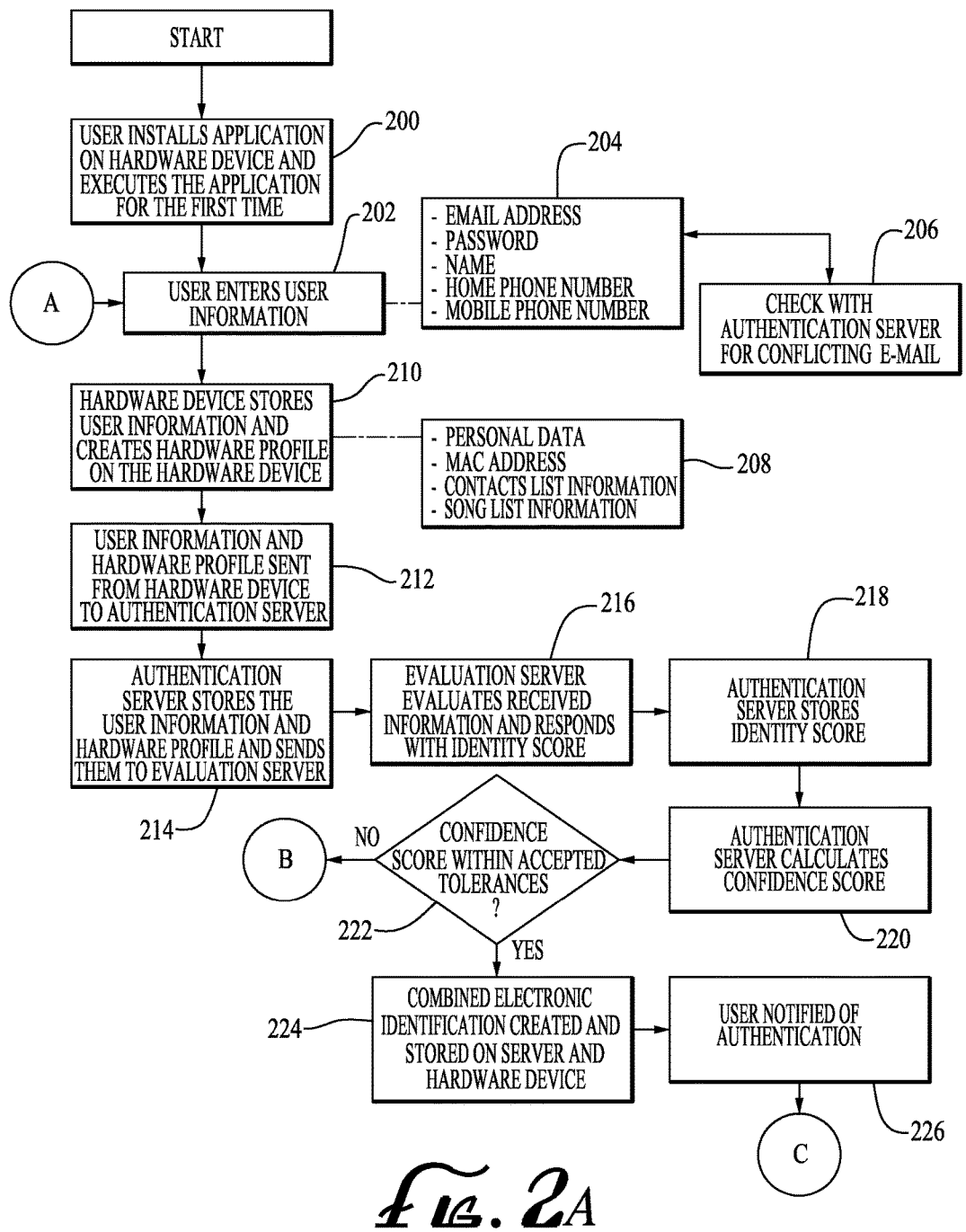
FIG. 2A shows a flow diagram that illustrates the process of creating a combined electronic identification from both the user side and the server side.
Figure 2B:
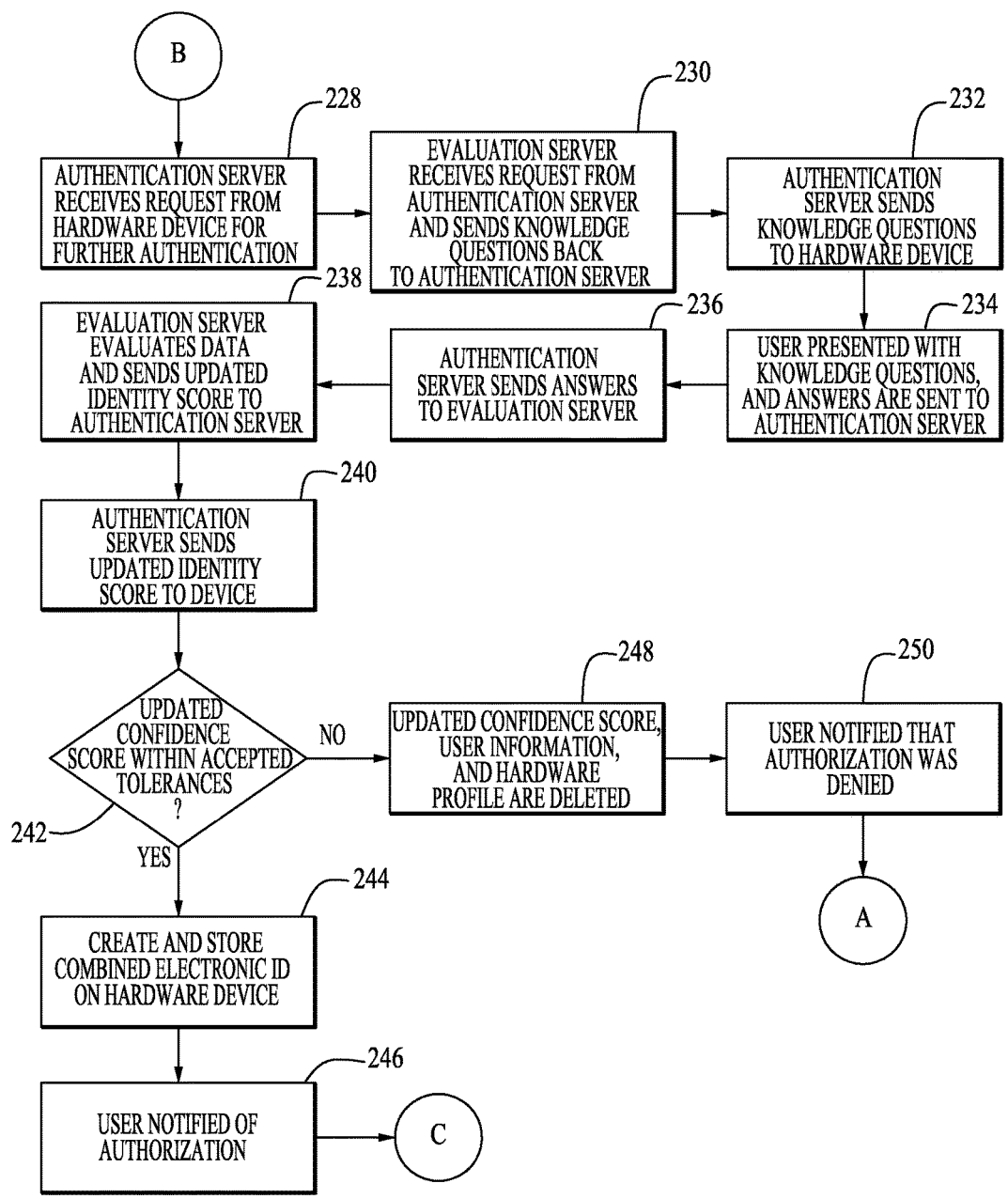
FIG. 2B shows a flow diagram that illustrates the process of creating a combined electronic identification from both the user side and the server side.

Referring now to FIGS. 2A and 2B, an embodiment of the present invention depicts a method of creating a combined electronic identification associated with a hardware device 100. A user first installs an application onto the hardware device and executes the application 200. The application is a program that is downloaded and installed onto the hardware device 100, and is used to create the combined electronic identification. The application obtains user information about the user of the device 202 by prompting the user to input user information 204 about the user on the device, including but not limited to, the user's e-mail address, password, name, address, home number, and mobile phone number. The e-mail address is checked with an authentication server to determine whether there is a conflicting e-mail that was previously registered 206.

In another version of the invention, the user information comprises information about the user selected from the group consisting of the user's (a) name, (b) the user's social security number, (c) national identification number, (d) passport number, (e) IP address, (f) vehicle registration number, (g) vehicle license plate number, (h) driver's license number, (i) appearance, (j) fingerprint, (k) handwriting, (l) credit card information, (m) bank account information, (n) digital identity, (o) date of birth, (p) birthplace, (q) past and current residence, (r) age, (s) gender, (t) marital status, (u) race, (v) names of schools attended, (w) workplace, (x) salary, (y) job position, (z) additional biometric data, and combinations of one or more thereof. All of this information, except for the password, can be automatically gathered by the application if it is already stored in the hardware device 100.

The user's name includes, but is not limited to, first, last, middle, and any nicknames, and portions thereof. The user's social security number and IP address include all or part of the number and combinations thereof. The user's national identification number, passport number, vehicle registration number, vehicle license plate number, and driver's license number include letters and symbols, in addition to numbers, and portions thereof. Biometric data includes, but is not limited to, fingerprint, handwriting, retina, appearance, and voice data. Credit card information includes all or part of the number, expiration date, issuing bank, type (e.g. Visa, MasterCard, Discover, or American Express) and combinations thereof. The user's digital identity includes characteristics and data attributes, such as a username and password for various online accounts (e.g. banking, social media, weblogs, e-mail, etc), online search activities (e.g. electronic transactions), medical history, purchasing history, purchasing behavior. A digital identity can also be linked to an e-mail address, URL, and domain name.

The hardware device stores the user information and obtains a hardware profile 208 of the hardware device 210, the hardware profile 208 comprising user generated data stored on the device 100. The hardware profile 208 includes, but is not limited to information on the hardware device selected from the group consisting of (a) contact information, (b) mobile network code, (c) information about music, (d) pixel colors from a background screen, (e) installed applications, (f) arrangement of the applications, (g) frequency of use of applications, (h) location of the user, (i) Bluetooth device pairings, (j) carrier name, (k) mobile country code, (l) phone number, (m) photos, (n) device name, (o) MAC address, (p) device type, and combinations of one or more thereof. The hardware profile 208 can also include portions of any of the above such as just a portion of the titles of some of the music on the device 100.

Contact information includes, but is not limited to, telephone numbers (home, work, and mobile), e-mail addresses (personal and work), addresses (home and work), and names (first, last, middle, and nickname) of contacts stored on the hardware device 100. Information about music includes, but is not limited to, song names, artist names, playlist names, songs in playlists, and duration of songs and playlists. Information about applications includes, but is not limited to, application names, size of applications, and version of applications. Information about photos includes, but is not limited to, photo names, photo locations, and photo sizes. Information about device type includes, but is not limited to, iPhone, iPad, Droid smartphone, and all other types of smartphones and tablet computers.

The hardware device 100 then sends the user information along with the hardware profile from the device to an authentication server 212 to create a combined electronic identification, the hardware profile 208 comprising user generated data stored on the device 100. In one version of the invention, the authentication server stores the user information and hardware profile and passes only portions of the received user information and none of the hardware information to an evaluation server 214. In order to authenticate the user from the user information, the evaluation server evaluates the information, and responds with an identity score based on the evaluation of the user provided information 216. The hardware device receives the authentication from the server. In the case the evaluation server is associated with Experian, a Precise ID (PID) score is received. In one case the identity score is a numerical representation (from 0 to 1000) of the likelihood the user is a fraud. The closer the identity score is to 1000, the less likely the user is a fraud. Preferably, the matter proceeds only if the identity score is over 660.

The authentication server stores the identity score 218 and uses it to create a confidence score 220, which is also stored on the authentication server. The confidence score is calculated using the identity score and the user information 220. The confidence score is a numerical representation of the likelihood the user is a fraud. If the confidence score is within accepted tolerances 222, the user information and the hardware profile are linked together to create the combined electronic identification that is stored on the hardware device and authentication server 224. The accepted tolerances are set according to the requirements of the transactions. For example, for lower value transactions the probability that it is an authenticated user may be set at 80%. For higher value transactions the probability that it is an authenticated user may be set at 99.999999%. Preferably, linking is done by concatenating the user information 202 and the hardware profile 208. The user is then notified of the authentication and creation of the combined electronic identification 226.

In one version of the invention at least one of the user information 202 and the hardware profile 208 are salted and hashed prior to linking. Alternatively, both the user information 202 and hardware profile 208 are salted and hashed prior to linking. Preferably, salting is done by a three to seven digit random number generator, and hashing is done by Secure Hash Algorithm-2 (SHA-2). The hash can be four digits of a 64 bit string. Preferably, the hardware profile 208 and user information 202 are salted and hashed before transfer to any external device. The salting and hashing can be by individual items or in groups of items.

In one version the hash is truncated to reduce the amount of information transmitted to a server. The truncation can be performed in such a way that sufficient information is retained to differentiate one user from another user.

In one version of the invention, if the confidence score is not within the accepted tolerances, a request is sent by the hardware device to the authentication server that further authentication is needed, and the authentication server receives the request 228. The authentication server then sends the request to the evaluation server, the evaluation server receives the request 230, and the evaluation server sends knowledge based questions (KBQ) to the authentication server 230, which sends the KBQ's to the hardware device 232. The knowledge questions are commonly used by credit agencies to verify a user's identity, and are commonly known in the art, e.g., "What was the color of your first car?" Preferably, the knowledge questions are sent in extensible markup language (XML) format. The user is presented with the knowledge questions, the user provides answers to the knowledge questions, and the answers are sent back to the evaluation server via the authentication server 234, 236. The evaluation server evaluates the answers and sends an updated identity score to the authentication server 238, which is then sent to the device 240. An updated confidence score is calculated using the updated identity score and the user information. If the updated confidence score is within accepted tolerances 242, the user information and the hardware profile are linked to create the combined electronic identification, which is stored on the hardware device 244, and the user is notified of the result 246. The accepted tolerances are set according to the requirements of the transactions. For example, for lower value transactions the probability that it is an authenticated user may be set at 80%. For higher value transactions the probability that it is an authenticated user may be set at 99.999999%. If the confidence score is not within accepted tolerances, the updated confidence score, user information, and hardware profile are deleted 248 and the user is notified that the authentication was denied 250.

Preferably, the confidence score determines the types of transactions that are available to the user, which includes consideration of the method by which the user was authenticated to create the combined electronic identification. For example, whether the user needed to answer KBQ's.

In one version of the invention, once the combined electronic identification is created, no personal identifying factors are retained or only a selected set is retained on the hardware device, such as the user's name and address.

Alternatively, instead of using an evaluation server 104, the user's identity can be verified by authenticating the user information against a private database or directory, including but not limited to, Lightweight Directory Access Protocol (LDAP) or Active Directory, as commonly known in the art. In another version of the invention, the user's identity can be verified by sending a one-time password to the user via voice call, SMS message, or e-mail, which is commonly known in the art.

Preferably, the above-described method is accomplished by executing the following algorithm:
I. User Information
1) Concatenate provided e-mail (SHA-2) and MAC address (SHA-2) and store. Include the salt: (SHA-2/123e-mailAddressSHA-2/321MACaddress). Salt is the extra digits appended to e-mail and MAC (123,321).
II. Generate Confidence Score
1) User Activity
  a) Did user perform an activity that enhances the confidence that they are the actual user of the device, such as selecting information already stored on the hardware device or whether the user is at a normal location consistent with their activities.
    i) If yes, set variable DPID to 90%
    ii) If no, set variable DPID to 70%
2) Receive KBQ identity score from evaluation server.
  a) If KBQ identity score is over 66, allow creation of combined electronic identification.
  b) If KBQ identity score is below 66, deny creation of combined electronic identification.
3) Calculate confidence score. Confidence score is stored on authentication server, never passed to hardware device.
  a) Confidence Score=(PID from Experian*DPID)* (0.01*KBQ identity score)
  b) Example: (630*0.9)*(0.01*73)=413, where for purposes of this example 630 is a generic PID that is representative of the type of score that can be provided.
III. Hardware Profile
1) Initial and Subsequent State Characteristics
  a) Device Characteristics
    i) MAC address
    ii) Device type—iPhone, iPad, etc. (*model)
    iii) Device name (*name)
    iv) Carrier name (*carrierName)
    v) Mobile Country Code (*mcc)
    vi) Mobile Network Code (*mnc)
  b) Device Personality
    i) Contacts using full name.
    ii) Songs using full song names.
    iii) Application names.
    iv) Bluetooth device parings. (go over testing methods with Charles)
    v) Photo names (as stored on device) (future development)
    vi) Photo locations (future development)
2) TraitWareID (TWID-Initial State)—Items sent to MongoDB
With the following items, create salted hashes with dynamic salt on the device and send to the server. In addition, store the salt independently on the device. Use a random five digit number for the salt.
  a) Initial Database of Contacts (Full Name)
  b) Initial Database of Song Titles (Use full titles)
  c) Initial Database of Apps (App name)
  d) Bluetooth Device Pairings
  e) Device type—iPhone, iPad, etc. (*model)
  f) Device name (*name)

g) Carrier name (*carrierName)
h) Mobile Country Code (*mcc)
i) Mobile Network Code (*mnc)

Figure 3A:
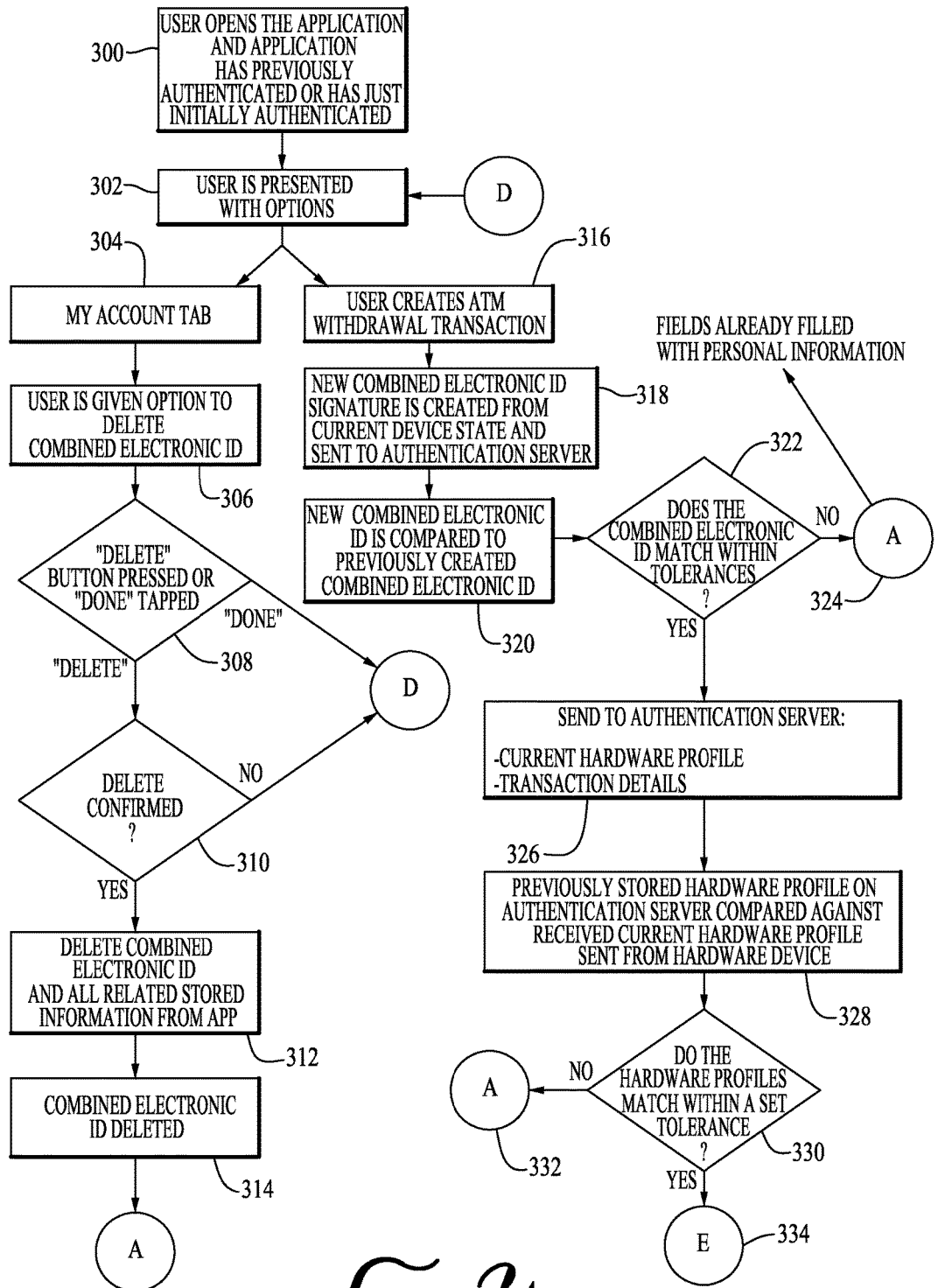
FIG. 3A shows a flow diagram that illustrates the process of allowing a transaction by a user to proceed from both the user side and the server side.
Figure 3B:
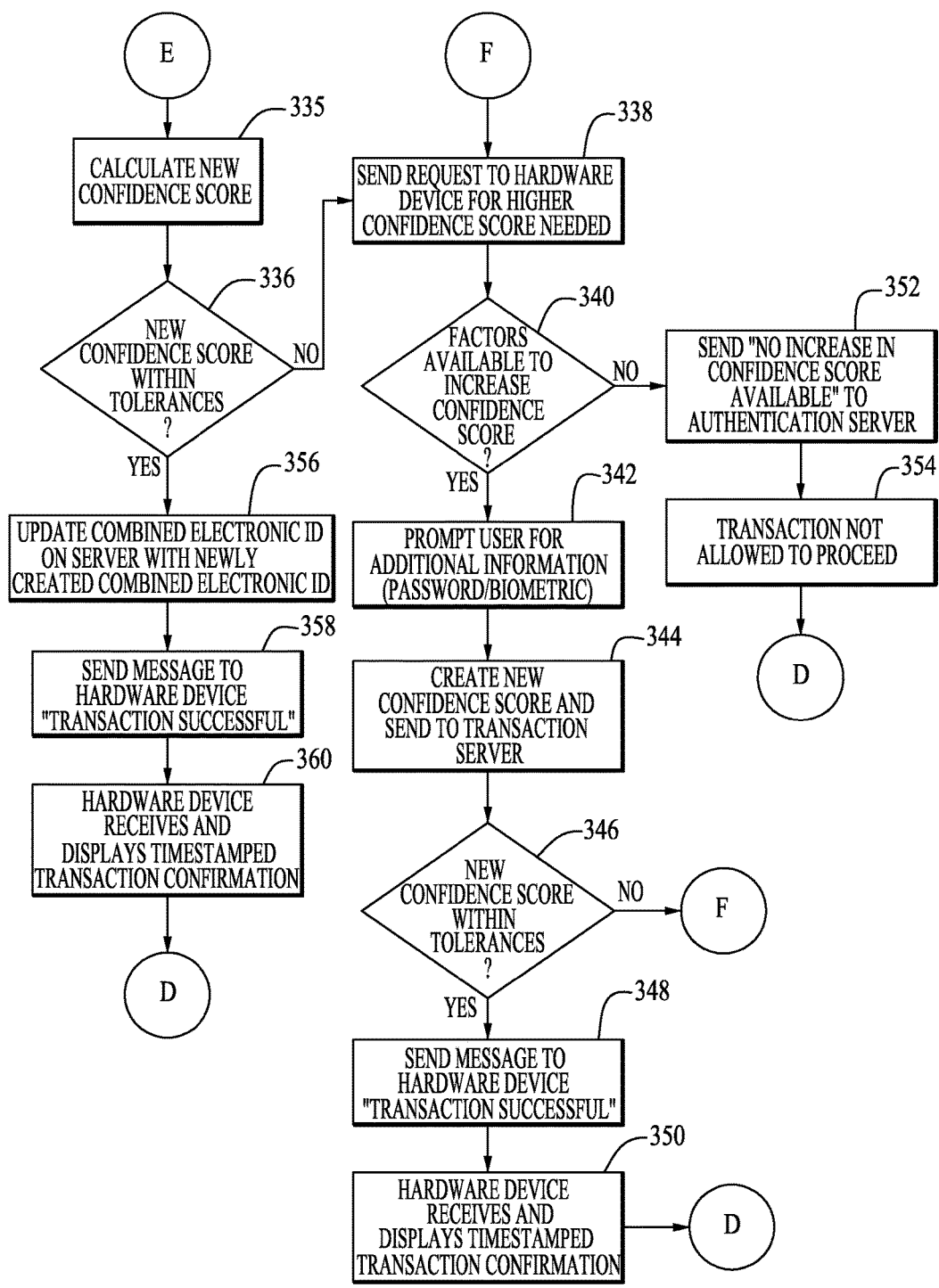
FIG. 3B shows a flow diagram that illustrates the process of allowing a transaction by a user to proceed from both the user side and the server side.

Referring now to FIGS. 3A and 3B, an embodiment of the present invention, depicting a method of allowing a transaction by a user utilizing a stored electronic identification, the stored electronic identification comprising a first stored hardware profile and stored user information, the method comprising the steps of receiving user information and a hardware profile of hardware associated with the user, both hardware profiles comprising user generated data stored on the device, comparing the received user information and the received hardware profile against the stored electronic profile, wherein the received hardware profile and the stored hardware profile are different by at least 0.02%, and allowing the transaction to proceed only if the received hardware profile and the stored hardware profile match by at least 60% and the received user information and the stored user information match by at least 30% is shown.

In another version of the invention, an authentication server 102 comprises a processor, memory, and a connection for receiving information for processing by the processor, the memory storing a stored user information and a stored hardware profile, the processor being programmed to receive through the connection the received user information and the received hardware profile, compare the received user information and the received hardware profile against the stored hardware profile wherein the received hardware profile and the stored hardware profile are different by at least 0.02%, and execute the transaction if the received hardware profile and the stored hardware profile match by at least 60% and the received user information and the stored user information match by at least 30%.

First the user opens the application after being authenticated and having a combined electronic identification created by the steps described above 300. The user is then presented with an option to either delete the combined electronic identification 302-312, or to initiate a transaction 316. In the figure, the transaction depicted is an ATM withdrawal. In other embodiments, the transaction can be any type of transaction, including, but not limited to, financial transactions, accessing a file, logging into a website, opening a door to a business or house, starting a car, and being alerted to a washing machine reaching the end of its cycle.

If the user chooses to initiate a transaction, the hardware device's current hardware profile and user information are used to create a new combined electronic identification on the hardware device, and the new combined electronic identification is sent to an authentication server 318. The authentication server then compares the new combined electronic identification that was sent from the hardware device with a stored previously created combined electronic identification on the authentication server 320. If they do not match 322, the transaction does not proceed 324. If they match within a set tolerance, the current hardware profile and transaction details are sent to an authentication server 326. In one embodiment, the set tolerance is between 0.02% and 76%.

The authentication server then compares the received current hardware profile to a previously stored hardware profile 328. This is accomplished by calculating the percentage difference of the previously stored hardware profile with the received current hardware profile. If the percentage difference is not within a set tolerance 330, the transaction does not proceed 332. In one embodiment, the set tolerance for the hardware profile is between 0.02% and 76%. If the current hardware profile matches the previously stored hardware profile within the set tolerance, the transaction is allowed to proceed 334. Alternatively, the combined electronic identifications and the hardware profiles are sent together for evaluation by the authentication server at the same time. Preferably the percentage difference between the current user information and a previously stored user information is also between 0.02% and 76%.

Preferably the transaction is allowed to proceed only if the current hardware profile and the previously stored hardware profile are different by at least a factor which is a function of the time since the last transaction. For example, a transaction may not be allowed to proceed unless there is a 0.02% change in the hardware profile, which would represent a change in one of the user's characteristics after a week.

In one version of the invention, the transaction is not allowed to proceed if the received hardware profile and the stored hardware profile are identical, which could indicate a copied profile.

A new confidence score 335 is generated by using the previously created combined electronic identification, the new combined electronic identification, the confidence score calculated based on the percent difference between the previously stored and current hardware profiles. The new confidence score is a numerical representation between 0 and 1 of the probability that the user is a fraud.

In one version multiple user hardware profiles are obtained for user information data and the percent differences between user hardware profiles are computed. The differences are used to create statistical distributions which can be used to create statistical probabilities by which a user data or information differs from another user and which can be used to determine that a device to which a user has been assigned is statistically different from another user. This information can be used to determine that a particular device belongs to a particular user.

In one version of the invention, the percent differences between user hardware profiles are computed using the Levenshtein Distance equation, which defines the distance between two strings a, b is given by $\text{lev}_{a,b}(|a|,|b|)$ where:

$$\text{lev}_{a,b}(i, j) = \begin{cases} \max(i, j), & \min(i, j) = 0 \\ \min \begin{cases} \text{lev}_{a,b}(i-1, j) + 1 \\ \text{lev}_{a,b}(i, j-1) + 1 \\ \text{lev}_{a,b}(i-1, j-1) + [a_i \neq b_j] \end{cases}, & \text{else} \end{cases}$$

The new confidence score is checked to determine if it is within a set tolerance 336. Preferably, the set tolerance is 99.999999%, so that the transaction proceeds only if the new confidence score is over 99.999999%. If it is not, then additional steps need to be taken to increase the new confidence score, such as prompting the user for a password or biometric authentication 338-350. If the confidence score is unable to be increased, the transaction is not allowed to proceed 352, 354.

If the new confidence score is within the set tolerance, the new combined electronic identification replaces the stored combined electronic identification on the authentication server and the transaction is allowed to be completed 356-360.

In another version of the invention, the transaction is allowed to proceed only if the received hardware profile and the stored hardware profile match by at least 40%. Alternatively, the transaction is allowed to proceed only if the received hardware profile and the stored hardware profile match by at least 50%. In another version the transaction is allowed to proceed only if the received hardware profile and the stored hardware profile are different by at least 1%.

It has been found that, though there will be changes in the user information and the hardware profile, individuals are sufficiently unique that a particular user can still be identified by the user information and the hardware profile to a high probability. The data shows that even if the received hardware profile and the stored hardware profile differ by 44%, there is still only a 1 in 360 billion chance that it is not the same device. If the data were to change by 60% there would be still be a 99.99% chance that the device is the same. Even a 76% difference corresponds to a 1 in 3 probability. In regards to the current invention, using the user information and the hardware profile results in differentiation of an individual device to greater than 1 in 500 million.

FIGS. 4A through 4F depict systems and methods for a user to perform a transaction with an electronic communication device 400, 402 comprising the steps of salting and hashing a hardware profile 208 of the electronic communication device 400, 402 with user information 204 stored on the device, the hardware profile comprising user generated data stored on the device, sending the salted and hashed hardware profile 208 and user information 204 to a server 404, and receiving instructions from the server 404 regarding whether or not to proceed with the transaction.

Preferably, salting is done by a three to seven digit random number generator, and hashing is done by SHA-2.

Preferably, the steps further comprise entering a security pin to verify the user. The security pin can be any arrangement of numerical digits that is well-known in the art.

In one version of the invention, a method for a user to perform a transaction utilizing a first electronic communication device 400 comprises the steps of connecting with a transaction receiver, receiving from the transaction receiver electronic data for a second electronic communication device 402 different from the first electronic communication device 400, the second electronic communication device 402 having a user associated therewith and a hardware profile 208 associated therewith, the hardware profile 208 comprising user generated data stored on the second electronic communication device 402, sending with the second electronic communication device 402 at least part of the received electronic data, user information 204 of the user, and the hardware profile 208 to an authentication server 404, and if the authentication server 404 authenticates the sent user information 206, the hardware profile 208, and the sent electronic data, performing the transaction with the first electronic communication device 400. Preferably, the method includes the step of authenticating with the authentication server 404. Preferably, the transaction receiver is a secure website that uses the methods described above in FIGS. 3A and 3B for authenticating a combined electronic identification for accessing the secure website.

In one version the first electronic communication device 400 comprises a visual display, wherein the visual display is read with the second electronic communication device 402.

In another version the second electronic communication device 402 comprises a visual display, wherein the visual display is read with the first electronic communication device 400.

Preferably, the visual display is a Quick Response (QR) code.

In one embodiment, a method of performing a transaction for a user using a first electronic communication device 400 to perform the transaction comprises the steps of receiving information from the first electronic communication device 400, transmitting electronic data to the user, receiving from a second electronic communication device 402 of the user at least part of the transmitted electronic data, user information 204 associated with the second electronic communication device 402, and a hardware profile 208 of the second electronic communication device 402, the hardware profile comprising user generated data stored on the second electronic communication device 402, and determining if the received electronic data, user information 204 and hardware profile 208 are authentic, and if authentic, permitting the user to perform the transaction with the first electronic communication device 400.

In one version of the invention, the method comprises the additional step of permitting the user to perform the transaction.

In one version of the invention, if the received electronic data, user information 204 and hardware profile 208 are authentic, the method comprises the additional step of performing the transaction for the user.

In another embodiment, a system for performing a transaction for a user using a first electronic communication device 400 to perform the transaction comprises a processor, memory, and a connection for receiving information executable by the processor, the memory storing electronic data, the processor being programmed to receive through the connection information from the first electronic communication device 400, transmit through the connection the stored electronic data to the user, receive through the connection from the second electronic communication device 402 at least part of the transmitted electronic data, user information 204 associated with the second communication device 402, and hardware profile 208 of the second communication device 402, and determine if the received electronic data, user information 204 and hardware profile 208 are authentic, and if authentic, permitting the user to perform the transaction with the first electronic communication device 400.

In one version of the invention, if the received electronic data, user information 204 and hardware profile 208 are authentic, the processor is programmed to send through the connection to the first electronic communication device 400 a response regarding whether or not to perform the transaction.

FIG. 4A depicts a system of performing a transaction with a first electronic communication device 400 and a second electronic communication device 402. Preferably, the first electronic communication device 400 is a desktop computer and the second electronic communication device 402 is a smartphone. The desktop computer can be a public computer, a workplace computer, or any computer not used by the user in relation to creating or authenticating a combined electronic identification. The smartphone has previously been used to create a combined electronic identification according to the methods described above in FIGS. 2A and 2B, and has a combined electronic identification associated with it. The first electronic communication device 400 and the second electronic communication device 402 each comprise a processor, memory, and a connection for receiving and transmitting information executable by the processor. The system further comprises an authentication server 404 and a webserver 406.

FIG. 4D describes a method of performing a transaction with a first electronic communication device 400 and a second electronic communication device 402. A user first navigates to a secure website which uses the methods described above in FIGS. 3A and 3B for authenticating a combined electronic identification for accessing the secure website 408. The user is presented with a visual display on the desktop computer, the visual display containing information about the website and the computer requesting access 410. Preferably, the visual display is a Quick Response (QR) code. In another version of the invention, the user receives a wireless signal instead of a visual display. The wireless signal can be of any type known in the art, including, but not limited to, near field communication (NFC) and Bluetooth. The information presented in the visual display or wireless signal may consist of, but is not limited to, the website URL, a geographic location, the IP address of the computer, a time stamp, and a date stamp.

The user scans the visual display with a program stored on the smartphone 412. Most smartphones come equipped with a program that uses a camera 403 on the smartphone to scan visual displays or other objects. The smartphone transmits the encoded information in the visual display along with the combined electronic identification to an authentication server 414. In the version where a wireless signal is used, the smartphone transmits the encoded information in the wireless signal along with the combined electronic identification to the authentication server.

The authentication server receives the encoded information and the combined electronic identification and analyzes the received encoded information and combined electronic identification to determine if the user has the necessary rights to access the secure website using the authentication method described above in FIGS. 3A and 3B 416. Preferably, the authentication process uses information such as a previously created combined electronic identity and a confidence score, which are stored on the authentication server or on the webserver.

The authentication server sends a response to a webserver 418 which then grants or denies access to the secure website 420. The response is displayed to the user on the desktop computer either allowing or denying the user access to the secure website.

In one version of the invention involving high security access, the user will have to use a biometric whose characteristics were previously stored on the smartphone, authentication server, or webserver to either access the smartphone or access the program used to read the QR code.

FIGS. 4B and 4E show another version of the invention, where a user scans a visual display generated by a secure website on a first electronic communication device with a second electronic communication device 422-426, and the second electronic communication device determines if the second electronic communication device has the appropriate credentials to access the secured website 428. The visual display contains encoded information about the website and the computer requesting access. Preferably, the first electronic communication device 400 is a desktop computer and the second electronic communication device 402 is a smartphone. The desktop computer can be a public computer, a workplace computer, or any computer not used by the user in relation to creating or authenticating a combined electronic identification. Preferably the desktop computer has a webcam 401 that is programmed to recognize QR codes. The smartphone has previously been used to create a combined electronic identification according to the methods described above in FIGS. 2A and 2B, and has a combined electronic identification associated with it.

If the smartphone has the appropriate credentials, the smartphone generates a visual display 430 which is scanned by the desktop computer to grant access to the secure website 432. The authentication process is the same as that described above for FIGS. 3A and 3B. Preferably, the visual display is a QR code. In another version of the invention, the user receives a wireless signal instead of a visual display. The wireless signal can be of any type known in the art, including, but not limited to, NFC and Bluetooth. The encoded information may contain, but is not limited to, login credentials, a geographic location, a confidence score, a time stamp, and a date stamp.

In one version of the invention involving high security access, the user will have to use a biometric whose characteristics were previously stored on the smartphone, an authentication server, or a webserver to either access the smartphone or access the program used to read the QR code.

FIGS. 4C and 4F show another version of the invention, where a user's smartphone, which has been previously authenticated according to the method described above in FIGS. 1-3, creates a QR code, or sends a wireless signal using NFC or Bluetooth, which contains encoded information about the user 434. The encoded information presented in the QR or wireless signal, includes, but is not limited to, a name, a geographic location, a time stamp, and a date stamp. The encoded information is for one-time use.

When the QR or other encoded information is created on the device, the device also sends the encoded information to an authentication server along with a combined electronic identification associated with the smartphone 436. The authentication server analyzes the combined electronic identification and matches the encoded information to an account of the user in order to authenticate the user. When a desktop computer scans the QR code or receives the wireless signal created by smartphone 438, the desktop computer sends the encoded message to a webserver 440. The desktop computer can be a public computer, a workplace computer, or any computer not used by the user in relation to creating or authenticating a combined electronic identification. Preferably the desktop computer has a webcam that is programmed to recognize QR codes.

The webserver queries the authentication server regarding whether the user is authenticated based on the encoded information and the combined electronic identification 442. The authentication server responds to the webserver to either grant or deny access to a secure website 444. The webserver then grants or denies access to the secure website 446.

In one version of the invention involving high security access, the user will have to use a biometric whose characteristics were previously stored on the smartphone, authentication server, or webserver to either access the smartphone or access the program used to read the QR code.

Although the present invention has been discussed in considerable detail with reference to certain preferred embodiments, other embodiments are possible. For example, the visual display can be a bar code. Therefore, the scope of the appended claims should not be limited to the description of preferred embodiments contained in this disclosure.

All the features disclosed in this specification (including any accompanying claims, abstract, and drawings) can be replaced by alternative features serving the same, equivalent or similar purpose, unless each feature disclosed is one example only of a generic series of equivalent or similar features.

What is claimed is:

1. A method of allowing a transaction by a user utilizing a stored electronic identification comprising the steps of:
 a) obtaining user information about a user of a device;
 b) authenticating the user from the user information, wherein authentication is positive when a generated confidence score based on the user information is within an accepted tolerance as a requirement of the transaction;

c) obtaining a device personality the device personality comprising user generated data stored on the device including color of a pixel from a background screen;

d) combining the user information and the device personality as a combined electronic identification and storing the combined electronic identification on an authentication server;

e) subsequently to storing the combined electronic identification on the authentication server and prior to the transaction, receiving an updated user information and an updated device personality comprising updated user generated data stored on the device including color of a pixel from a background screen;

f) comparing an updated combined electronic identification from the updated user information and the updated device personality against the combined electronic identification;

g) generating an updated confidence score using the comparison of the updated combined electronic identification and the combined electronic identification;

h) replacing the combined electronic identification on the server with the updated electronic combined identification only when the updated confidence score is within a first set tolerance; and i) allowing the transaction to proceed only when the updated confidence score is within the first set tolerance and after the replacement of the combined electronic identification on the server with the updated combined electronic identification when the updated device personality and the device personality match within a second set tolerance.

2. The method of claim 1, wherein the user information comprises information about the user selected from the group consisting of the user's (a) name, (b) the user's social security number, (c) national identification number, (d) passport number, (e) IP address, (f) vehicle registration number, (g) vehicle license plate number, (h) driver's license number, (i) appearance, (j) fingerprint, (k) handwriting, (l) credit card information, (m) bank account information, (n) digital identity, (o) date of birth, (p) birthplace, (q) past and current residence, (r) age, (s) gender, (t) marital status, (u) race, (v) names of schools attended, (w) workplace, (x) salary, (y) job position, (z) additional biometric data, and combinations of one or more thereof.

3. The method of claim 1, wherein at least one of the user information and the device personality are salted and hashed prior to combining.

4. The method of claim 1, wherein the step of combining comprises concatenating the user information and the device personality.

5. A system for allowing a transaction, comprising one or more processors, and one or more memory, wherein the one or more memories have stored thereon machine readable instructions that when executed by the one or more processors is configured to perform the functions of:

receive user information about a user of a device;
receive a device personality, the device personality comprising user generated data stored on the device including a color of a pixel from a background screen;
combine the user information and the device personality as a combined electronic identification;
store the combined electronic identification on an authentication server;

subsequently to storing the combined electronic identification on the authentication server and prior to the transaction, receive an updated user information and an updated device personality comprising user generated data stored on the device including a color of a pixel from a background screen;
compare an updated combined electronic identification from the updated user information and the updated device personality against the combined electronic identification;
generate a confidence score using the updated combined electronic identification and the combined electronic identification;
replacing the combined electronic identification on the server with the updated combined electronic identification only when the confidence score is within a first set tolerance; and
allow the transaction to proceed after the replacement of the combined electronic identification on the server with the updated combined electronic identification when the updated device personality and the device personality match within a second set tolerance;
wherein the second set tolerance is determined by:
collecting multiple user device personalities;
creating statistical distributions to create statistical probabilities to determine how much an individual device personality associated with one user differs from another individual device personality associated with another user; and
using the statistical probabilities to determine the set tolerance where a device to which a user has been assigned is statistically different from an other device from another user.

6. A method comprising the steps of:

a) receiving user information about a user on a device,
b) sending data related to the user information from the device to a server;
c) sending a device personality from the device to the server, the device personality related to user generated data stored on the device including pixel color of a background screen;
d) creating a combined electronic identification from the data related to the user information and the device personality and storing the combined electronic identification on the server;
e) subsequently to storing the combined electronic identification on the server and prior to a transaction, sending updated data related to user information and an updated device personality related to user generated data stored on the device to the server;
f) comparing an updated combined electronic identification based on the data related to the user information and the updated device personality against the combined electronic identification;
g) generating a confidence score using the updated combined electronic identification and the combined electronic identification;
h) replacing the combined electronic identification previously stored on the server with the updated combined identification only when the confidence score is within a first set tolerance; and
i) subsequent to the replacing, allowing the transaction to proceed only after comparing the device personality and the updated device personality and when the device personality and the updated device personality match within a second set tolerance, wherein the second set tolerance between the device personality and the updated device personality is determined by:

collecting multiple user device personalities;

creating statistical distributions to create statistical probabilities to determine how much an individual device personality associated with one user differs from another individual device personality associated with another user; and using the statistical probabilities to determine the second set tolerance where a device to which a user has been assigned is statistically different from an other device from another user.

7. The method of claim 6, wherein the comparing the device personality and the updated device personality comprises determining a percent difference between the device personality and the updated device personality using a Levenshtein Distance equation.

8. The method of claim 6, wherein allowing the transaction to proceed occurs when a percentage difference between the device personality and the updated device personality is between 0.02% and 76%.

9. The method of claim 8, wherein both the user information and the device personality are salted and hashed prior to combining.

10. The method of claim 9, wherein salting is done by a three to seven digit random number generator, and hashing is done by SHA-2.

* * * * *